(12) United States Patent
Edwards et al.

(10) Patent No.: US 6,484,997 B1
(45) Date of Patent: Nov. 26, 2002

(54) TERMINAL BLOCK MOUNTING TRACK

(76) Inventors: Guy Edwards, 16369 Blue Skies, Livonia, MI (US) 48154; Paul Letwinski, 10000 Seltzer, Livonia, MI (US) 48150

( * ) Notice: Subject to any disclaimer, the term of this patent is extended or adjusted under 35 U.S.C. 154(b) by 0 days.

(21) Appl. No.: 09/426,117

(22) Filed: Oct. 22, 1999

(51) Int. Cl.[7] ................................................ F16M 11/18
(52) U.S. Cl. ............... 248/906; 248/223.4; 248/224.51; 439/110; 52/729.1
(58) Field of Search ....................... 248/223.41, 224.51, 248/224.61, 351, 906; 439/110, 121; 138/117, 92, 155; 179/48, 72 A, 101; 52/729.1, 733.2, 36.5, 36.6

(56) References Cited

U.S. PATENT DOCUMENTS

| | | | |
|---|---|---|---|
| 3,210,716 A | * 10/1965 | Meacham | 339/21 |
| 3,554,236 A | 1/1971 | Rhodes | 138/117 |
| 3,566,561 A | * 3/1971 | Tozer | 52/127 |
| 3,636,984 A | 1/1972 | Rauhauser | 138/155 |
| 3,763,401 A | 10/1973 | Ransom | 317/122 |
| 3,782,048 A | * 1/1974 | Corman | 52/738 |
| 3,786,171 A | 1/1974 | Shira | 174/48 |
| 3,968,322 A | 7/1976 | Taylor | 174/72 A |
| 4,008,872 A | * 2/1977 | Thompson | 248/224.2 |
| 4,057,312 A | * 11/1977 | Hagermo | 339/21 |
| 4,077,434 A | 3/1978 | Sieckert et al. | 138/92 |
| 4,136,257 A | 1/1979 | Taylor | 174/68 C |
| 4,164,618 A | 8/1979 | Casasanta | 174/48 |
| 4,255,610 A | 3/1981 | Textoris | 174/48 |
| 4,398,564 A | 8/1983 | Young et al. | 138/92 |
| 4,570,390 A | * 2/1986 | Wendt | 52/36 |
| 4,593,506 A | 6/1986 | Hartman et al. | 52/221 |
| 4,694,531 A | * 9/1987 | Foy | 16/87.4 R |
| 4,776,815 A | 10/1988 | Baillet et al. | 439/724 |
| 4,864,082 A | 9/1989 | Ono et al. | 174/97 |
| 4,895,331 A | * 1/1990 | Nehls | 248/245 |
| 5,013,873 A | 5/1991 | Deibele et al. | 174/101 |
| 5,023,404 A | 6/1991 | Hudson et al. | 174/97 |
| 5,024,251 A | 6/1991 | Chapman | 138/92 |
| 5,073,841 A | 12/1991 | DelGuidice et al. | 361/428 |
| 5,089,667 A | 2/1992 | Goussin et al. | 174/101 |
| 5,090,922 A | 2/1992 | Rymer et al. | 439/716 |
| 5,145,418 A | 9/1992 | Moranski et al. | 439/716 |
| 5,185,501 A | 2/1993 | Oha | 174/136 |
| 5,226,724 A | 7/1993 | Kanarek | 362/260 |
| 5,354,114 A | 10/1994 | Kelman et al. | 296/192 |
| 5,441,327 A | * 8/1995 | Sanderson | 297/195.1 |
| 5,595,123 A | * 1/1997 | Tao et al. | 105/396 |
| 5,597,980 A | 1/1997 | Weber | 174/72 A |
| 5,794,901 A | * 8/1998 | Sigel | 248/221.11 |
| 5,833,417 A | * 11/1998 | Sargent et al. | 411/85 |
| 5,844,169 A | 12/1998 | Uemura et al. | 174/68.3 |
| 5,898,132 A | 4/1999 | Lee | 174/101 |
| 5,901,512 A | 5/1999 | Bullwinkle | 52/220.7 |
| 6,105,794 A | * 8/2000 | Bauer | 211/94.01 |

* cited by examiner

Primary Examiner—Anita King
Assistant Examiner—Steven Marsh
(74) Attorney, Agent, or Firm—Gifford, Krass, Groh, Sprinkle, Anderson & Citkowski, P.C.

(57) ABSTRACT

A terminal mounting track for supporting objects of more than one type has a base which is designed to attach the track to a support surface. A support member projects from the base and an elongated mounting rail is supported by the support member in a spaced apart relationship with the base. The rail has a pair of spaced apart elongated mounting flanges and a mid-portion which joins the flanges to the support member. The mid-portion includes a first wall segment and a second wall segment which are joined together so as to define a V-shaped groove which is configured to accept a sheet metal screw. Objects such as other dimensions of rails and electrical boxes may be mounted to the track using a sheet metal screw that engages the groove.

20 Claims, 2 Drawing Sheets

US 6,484,997 B1

TERMINAL BLOCK MOUNTING TRACK

FIELD OF THE INVENTION

The present invention relates generally to terminal block mounting track and, more specifically, to a track designed to support objects of more than one type.

BACKGROUND OF THE INVENTION

When wiring electrical panels, all electrical devices must be interconnected. To do so neatly, electricians will route the electrical wiring in wiring ducts. These ducts typically are U-shaped channels, several inches deep, with openings along the sides for routing wiring into and out of the ducts. The ducts also typically include a cover to close the top of the U-shaped channel once the wiring is complete. These wiring ducts typically mount to the electrical panel with the open end of the U-shaped channel facing away from the panel. Electrical devices, such as circuit breakers and terminal blocks, are then typically mounted to a terminal mounting track. Wires are then routed through the ducts to a place where a wire exits the duct to be connected to an electrical device, such as the circuit breaker or switch, or to a terminal block which connects one piece of wire to another piece of wire. As the ducts, which are several inches deep, fill with wire, it is easiest to have pieces of wire entering and exiting the duct near the top of the U-shaped channel, or at least part way up the wall. If the electrician were to have the wire exit near the base of the U-shaped channel, it would be necessary to move all the other wiring already in the channel to do so. Therefore, it is simplest to have the wire exit higher up away from the panel. Because the wire is to be connected to a terminal block or an electrical device, it is desirable to have the electrical device or terminal block supported up off the panel also. Therefore, traditional terminal block mounting track was developed to provide this function.

A standard piece of terminal track 10 is shown in FIG. 2. The track 10 has a base 12 which is a generally flat member with mounting holes 14 defined therein for mounting the track 10 to an electrical panel. A support wall 16 projects perpendicularly from the base 12 so as to extend away from an electrical panel that the base 12 is mounted to. The support wall 16 is also a generally flat member. An elongated mounting rail 18 is supported at the top of the support wall 16 so that it is spaced from the base 12. The rail 18 includes a pair of parallel and spaced apart elongated mounting flanges 20 and 22 and a trough shaped mid-portion 24 which joins the flanges 20 and 22 to the support wall 16. Terminal track 10 comes in a variety of standard sizes. For example, the distance between the outer edges of the flanges 20 and 22 is designed so that electrical devices and mounting blocks can attach thereto by gripping the outer edges. There are generally three standard sizes. First, there is NEMA standard track wherein the outer edges of the flanges 20 and 22 are approximately 0.9 inches apart. NEMA standard track has traditionally been used in the United States. NEMA terminal blocks easily connect to the top of NEMA standard track. Therefore, when wiring a panel, a piece of terminal track, such as standard track 10, is mounted near a wiring duct. Then, where a piece of wire exits the duct, a terminal block may be mounted to the top of the track 10 such that it grips the flanges 20 and 22. The track 10 supports the terminal block up off of the panel so that it is easy to wire.

Another standard track size is known as DIN wherein the outer edges of the flanges 20 and 22 are approximately 35 millimeters apart. There is also a standard size known as mini-DIN wherein the outer edges of the flanges 20 and 22 are approximately 15 millimeters apart. Standard DIN and standard mini-DIN track is used in a manner similar to standard NEMA track, but is designed to accept electrical devices and terminal blocks of other sizes. DIN and mini-DIN are two standard sizes generally used in Europe.

A problems arises in that many wiring projects either preferably or necessarily use a mixture of NEMA, DIN and mini-DIN electrical devices and mounting blocks. Each of these devices and blocks will only mount to a piece of mounting tracks specifically sized for them. Therefore, an electrician is often forced to use multiple small pieces of one or more sizes of track so as to provide mounting spaces for each of the types of devices and blocks to be used. For comparison, where only one size of device and block is to be used, a continuous piece of mounting track in the corresponding size may be run along the side of a wiring duct so that anywhere a piece of wire exits the duct, a device or block may be mounted to the track in close proximity. Where a mixture of sizes is to be used, a single continuous piece of track cannot be used. Instead, the electrician must first determine where each type of device will be used along the run of the duct and then provide different short pieces of mounting track in the corresponding locations. This greatly hampers flexibility and complicates installation. Electricians are forced to cut small pieces of track and mount them end to end. If the design changes, it requires removing and replacing the piece of track so that a different type of device can be supported.

In light of this, there is a need for a terminal mounting track that will support electrical devices and mounting blocks of more than one type, preventing the need for intermixing different types of tracks.

SUMMARY OF THE INVENTION

According to the present invention, many of the shortcomings of the prior art terminal mounting tracks are overcome. A terminal mounting track for supporting objects, such as electrical devices and mounting blocks, of more than one type includes a base which is configured to attach the track to a support surface, such as an electrical panel. A support member projects from the base and an elongated mounting rail is supported by the support member in a spaced apart relationship with the base. The rail includes a pair of spaced apart elongated mounting flanges and a mid-portion which joins the flanges to the support member. The mid-portion defines a first wall segment and a second wall segment, with these wall segments being joined together so as to define a V-shaped groove configured to accept sheet metal screws. This device allows objects, such as pieces of other widths of tracks and electrical boxes to be mounted to the track using a sheet metal screw which engages the groove.

DETAILED DESCRIPTION OF THE PREFERRED EMBODIMENTS

Figure 2:
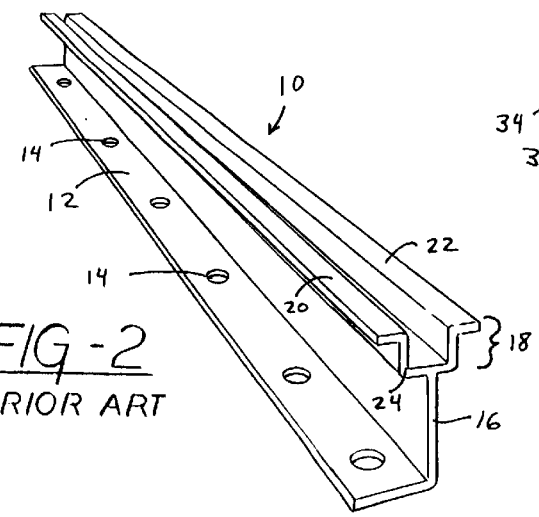
FIG. 2 is a perspective view of a piece of standard terminal mounting track that lacks the features of the present invention.
Figure 3:
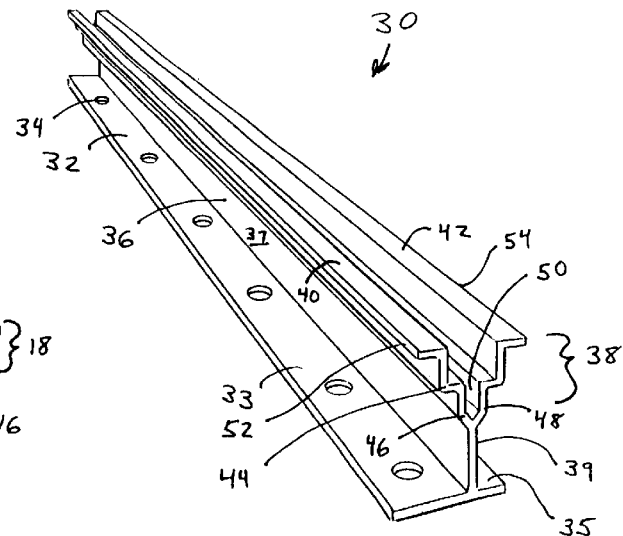
FIG. 3 is a perspective view of a piece of terminal mounting track according to the present invention.

Referring to FIG. 3, a terminal mounting track, according to the present invention, is generally shown at 30. The track 30 includes a base 32 which is configured to attach the track 30 to a support surface, such as an electrical panel. The base 32 has holes 34 defined therethrough for facilitating attachment of the track 30 to the support surface. The base 32 is preferably a generally flat elongated member with the holes 34 spaced at intervals along it. A support member 36 projects from the base, preferably at a right angle. Unlike the prior art track 10 of FIG. 2, the support member 36 projects from the base 32 at a location away from the base's two edges. If support member 36 is defined to have a first side 37 and a second side 39, the base 32 may be defined as having a first portion 33 which extends from the first side 37 of the support member 36 and a second portion 35 which extends from the second side 39 of the support member 36. In other words, the base 32 and the support member 36 preferably have a general T-shaped crossed section. However, as shown, the first portion 33 and second portion 35 of the base 32 may be different widths, thereby forming a lopsided T-shape. This differs from the prior ant track of FIG. 2, wherein the support wall 16 and the base 12 form a generally L-shaped cross section. The advantage to the track 30 in FIG. 3 is that the second portion 35 of the base 32 extending from the second side 39 of the support member 36 provides a stabilizing effect when the track 32 is placed on a support surface. That is, the track 30 will stand upright on its own prior to being attached to the support surface, facilitating assembly.

The terminal mounting track also has a rail 38 which is supported by the support member 36 in a spaced apart relationship with the base 32. Preferably, the rail 38 and the base 32 are parallel to one another. Like with the track 10 in FIG. 2, the rail 38 has a pair of spaced apart flanges 40 and 42 which are configured so that a terminal block or electrical device may mount thereto. The flanges 40 and 42 are preferably parallel to one another with each being a flat member. They are also preferably in a common plane. The flanges 40 and 42 are joined to the support member 36 by a mid-portion 44. This mid-portion 44 defines a first wall portion 46 and a second wall portion 48 which are joined together so as to form a V-shaped groove 50. The V-shaped groove 50 is sized and shaped so as to accept sheet metal screws, which will engage and grip the sides of the groove 50. Overall, the rail 38 is generally trough shaped, with the flanges 40 and 42 extending outwardly from the upper edges of the troughs and the V-shaped groove 50 defined in the bottom of the trough.

The flanges 40 and 42 each have outer edges 52 and 54. These are spaced apart at a standard distance so that an electrical device or terminal block may grip these outer edges 52 and 54 of the flanges 40 and 42 and, thereby, be mounted on the track 30. In one preferred embodiment, the outer edges 52 and 54 are spaced apart by distance of approximately 0.9 inches, which corresponds to NEMA standard track. Therefore, any NEMA standard mounting block may be snapped on to the provided flanges 40 and 42 of the track 30, as will be clear to those skill of the art.

Figure 4:
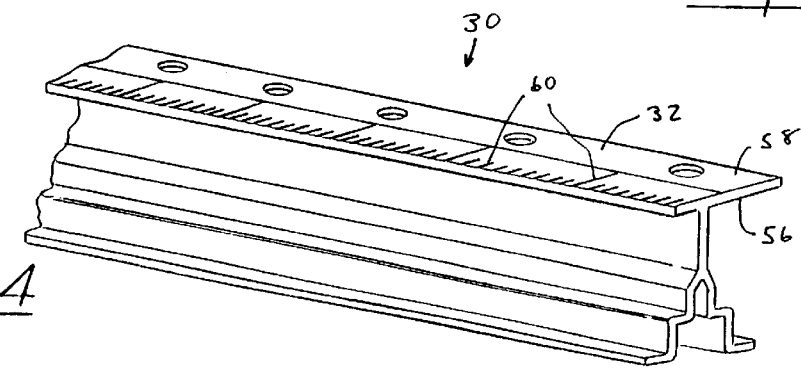
FIG. 4 is a perspective view showing the bottom side of the base of the terminal mounting track of FIG. 3 so as to illustrate linear dimension markings disposed thereon.

Referring now to FIG. 4, the track 30 is shown rotated so that the base 32 is upward. The base 32 is defined as having an upper surface 56 and a lower surface 58, with upper and lower referring to the surfaces when viewed with the track 30 in the orientation of FIG. 3. In one preferred embodiment, the lower surface 58 of the base 30 has linear longitudinal dimension markings 60 disposed thereon to facilitate measurement of the track 30. Often, an electrician installing a piece of terminal mounting track needs to cut that track to a specific length. By providing linear longitudal dimension markings 60 on the under side of the track 30, the electrician does not need to separately measure the track, but instead, can refer to the markings 60. The markings 60 may be painted or marked directly on to the lower surface 58, or may be installed as a piece of film with the markings already thereon. Alternatively, the markings could appear elsewhere on the track, such as on the upper surface 56 of the base 32, or elsewhere. A film with linear longitudal dimension markings may also be separately provided so that it can be placed anywhere to ease measurement and cutting of materials.

Figure 6:
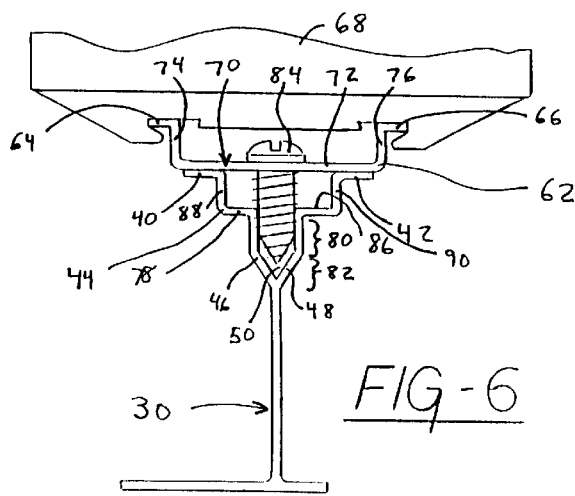
FIG. 6 is a cross sectional view of a piece of terminal mounting track according to the present invention with a piece of wider rail mounted thereto, using a sheet metal screw.

Referring now to FIG. 6, a cross section of a piece of terminal rail 30 is shown with a piece of wider rail 62 mounted thereto. For example, the wider rail 62 may be a piece of DIN standard rail, while the illustrated piece of track is sized for the narrower NEMA standard. The DIN rail 62 has a pair of flanges 64 and 66 which are spaced apart by the distance specified by the DIN standard. A portion of an electrical device 68 is shown gripping these flanges 64 and 66. The DIN rail 62 has a mid-portion 70 which interconnects the two flanges 64 and 66. This mid-portion 70 comprises a generally flat center section 72 with a pair of side walls 74 and 76, extending perpendicularly upwardly from its spaced apart edges. The flanges 64 and 66 extend outwardly from the tops of the side walls 74 and 76. Therefore, the flanges 64 and 66 are disposed in one plane while the center section 72 is in a different plane which is parallel to and offset from the plane containing the flanges 64 and 66. As shown, the center section 72 of the mid-portion 70 of the DIN rail 62 is as wide or wider than the distance between the outer edges 52 and 54 of the flanges 40 and 42 of the track 30. Therefore, the center section 72 of the DIN rail 62 may rest securely atop the flanges 40 and 42 of the track 30.

More details of the mid-portion 44 of the rail 38 of the track 30 will now be described. Mid-portion 44 has a center section 78 which includes the first and second wall segments 46 and 48 which form the V-shaped groove 50. As shown, the groove 50 has an upper portion 80 wherein the wall segments 46 and 48 are parallel to one another and a lower portion 82, wherein the wall segments 46 and 48 angle towards one another until they join. Also as shown, where the wall segments 46 and 48 join, they also join the upper edge of the support member 36. As shown, this shape of the groove 50 allows a screw 84 to engage the sides of the groove 50. In FIG. 6, the screw 84 passes through the center section 72 of the DIN rail 62 and engages the groove 50 so as to attach the DIN rail 62 to the top of the track 30. As will be clear to those of skill in the art, the dimensions and shape of the V-shaped groove 50 may be chosen so as to allow any of a variety of screws 84 to engage therewith. By V-shaped, it is meant that the groove 50 has an opened top and a closed bottom, but not that it is necessarily shaped like the letter V. The groove 50 could have a U-shaped cross section, wherein the bottom of the groove is flat. This would still be considered V-shaped, in the sense of this invention. However, for most types of screws which will be attached to a track according to the present invention, a groove shaped as illustrated is preferable. In one preferred embodiment, the groove has a width at its top of approximately 0.12 inches and a depth of approximately 0.282 inches so that a #8 screw will engage therewith. Obviously, the dimension of the groove may be altered for use with other screws without departing from the teaching of the invention.

Returning again to FIG. 6, the center section 78 of the mid-portion 44 of the rail 38 extends perpendicularly outwardly from the top of the groove 50 so as to define a bottom surface 86 which occupies a plane offset from the plane containing the flanges 40 and 42. The surface 86 is defined as a bottom surface for definitional purposes because it defines the bottom of the top part of the rail 38, even though the groove 50 extends downwardly therefrom. Side walls 88 and 90 extend perpendicularly upwardly from this surface 86 with the flanges 40 and 42 extending perpendicularly outwardly from the side walls 88 and 90 at their top edges. As shown, the V-shaped groove 50 is preferably in the center of the center section 78, but alternatively, may be offset or angled if desired for a particular application.

Figure 5:
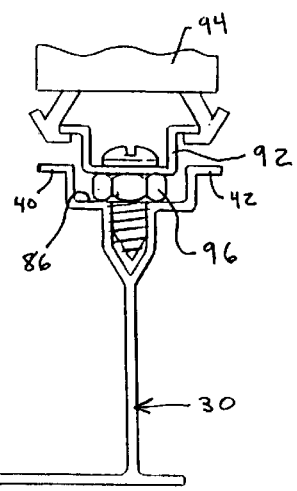
FIG. 5 is a cross sectional view of a piece of terminal mounting track, according to the present invention, with a piece of smaller dimension rail mounted thereto using a sheet metal screw.

Referring now to FIG. 5, a piece of rail 92, meant to represent mini-DIN rail is mounted to a piece of track 30 with a portion of a mini-DIN electrical device 94 shown attached to the piece of rail 92. Because the mini-DIN rail 92 is narrower than the rail 38 at the top of track 30, it will not sit atop the flanges 40 and 42, as with the larger DIN rail 62 in FIG. 6. Therefore, a spacer 96 is used to space the mini-DIN rail 92 from the bottom surface 86 of the rail 38. The spacer 96, as illustrated, is a standard nut but other types of spacers also may be used.

Figure 1:
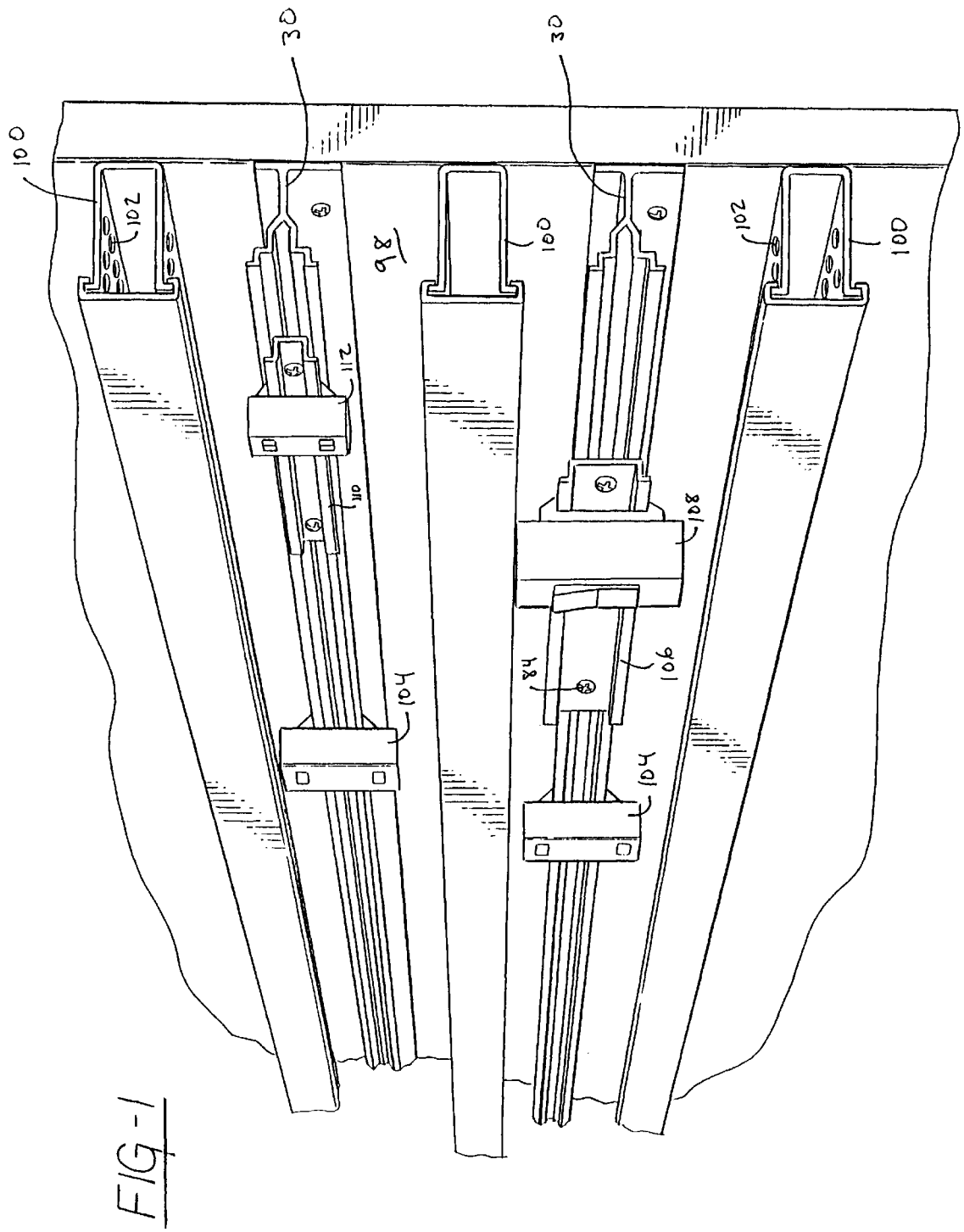
FIG. 1 is a perspective view of a portion of an electrical panel with two pieces of terminal mounting track, according to the present invention, and three pieces of wiring duct mounted thereto.

Referring now to FIG. 1, the use of terminal track 30, according to present invention, will now be described. In FIG. 1, a mounting panel 98 is shown with three parallel elongated wiring ducts 100 mounted thereto. Mounted to the panel 98, between the ducts 100, are two pieces of elongated mounting track 30, according to the present invention. The tracks 30 are generally parallel to the ducts 100. This is an arrangement that may be used for a wiring panel so that wire may be routed through the ducts 100 from electrical device to electrical device. The ducts are shown having circular openings 102 in the side walls thereof for wire to enter and exit the ducts 100. Terminal blocks 104 sized to fit the tracks 30 are shown mounted thereto, in a manner known to those of skill in the art. In the illustrated embodiment, the tracks 30 are sized for NEMA standard components and the terminal blocks 104 are NEMA terminal blocks. Obviously, track 30, according to the present invention may be provided in other widths so that it is sized for DIN, mini-DIN or some other standard without requiring another piece of rail to be mounted thereto. Also illustrated is a piece of DIN rail 106 attached to the top of one of the tracks 30 using screws 84. A DIN device 108 is shown attached thereto, in the manner known to those of skill in the art. A piece of mini-DIN rail 110 is shown attached to the other track 30 with a mini-DIN device 112 attached thereto.

As will be clear to those of skill in the art, the present invention provides many advantages. A single piece of elongated track 30 may be installed next to a wiring duct 100. In locations where a piece of other size rail is required, a small piece of that rail may be attached directly to the track 30, with no need to cut the track and replace it with a different type of track. Also, no drilling is required to attach the rails 106 and 110 to the track 30 because of the V-shaped groove. Other benefits will be clear to those of skill in the art. One of these is that any type of object may be attached to the top of the rail 30 using the V-shaped groove. Therefore, an electrical wiring box, which does not have gripping fingers for gripping a rail, may be attached using screws. Other objects that are also not designed for attachment to a normal rail, may also be attached using screws. Additionally, rail according to the present invention may be provided in different sizes to suit different applications. One preferred embodiment of the present rail is approximately 1.72 inches tall, which allows it to work well with 3 inch and 4 inch tall wiring ducts. Another preferred height is approximately 2.25 inches which is the height of standard NEMA high-rise track and works best with 4 inch tall wiring ducts. Obviously other heights may also be desirable.

The present invention has applications beyond the field of electrical wiring. For example, a piece of track may be mounted to a surface and then used as a pegboard replacement. A piece of track 30 may be mounted above a workbench and then various supports for tools and other objects may be connected to the track using screws. For this use, it may be desirable to make the track 30 lower profile and heavier wall thickness to stand higher loads. As another use, a piece of track 30 may be used as a sign post allowing a sign to be attached at any position along the length of the post. Yet another use is as uprights for skids to support a piece of equipment. Traditionally, skids for supporting equipment are constructed from wood and then scrapped. A piece of track may form the uprights of a skid with a piece of equipment connected directly to the top of the track. This spaces the piece of equipment away from the ground to allow easy lifting and allows for very simple construction of the skid. Once again, a heavier duty version of the track would be desirable. Many other applications will also be clear to those of skill in the arts. Therefore, the presently discussed and illustrated embodiments should be considered only examples. The specification should be interpreted broadly. It is the following claims, including all equivalence, that define the scope of the invention.

We claim:

1. A terminal mounting track for supporting objects of more than one type, said track comprising:
   a substantially flat base configured for attaching said track to a support surface;
   a substantially flat support member projecting from said base; and
   an elongated mounting rail supported by said support member in a spaced apart relationship with said base, said rail comprising a first wall segment and a second wall segment extending from said support member and joined together so as to define a tapered groove configured to accept a sheet metal screw, said wall segments bending outwardly away from each other so as to be generally coplanar, then said wall segments bending upwardly so as to be generally parallel and said wall segments terminating in a pair of outwardly extending, spaced apart, elongated, generally parallel mounting flanges, said outwardly extending flanges each terminating in an outwardly directed edge;
   whereby objects may be mounted to said track by a sheet metal screw engaging said groove.

2. The terminal mounting track according to claim 1, wherein said base consists of an elongated flattened member parallel to said rail, said base having a plurality of mounting holes defined therethrough for mounting said track to the support surface.

3. The terminal mounting track according to claim 2, wherein said support member projects generally perpendicularly from said base.

4. The terminal mounting track according to claim 1, wherein said support member includes a first side and a second side, and said base includes a first portion which extends from said first side and a second portion which extends from said second side so that said support member and said base have a generally T-shaped cross section.

5. The terminal mounting track according to claim 1, wherein said base has mounting holes defined therethrough for mounting said track to said support surface.

6. The terminal mounting track according to claim 1, wherein said base has an upper surface and a lower surface, said lower surface having linear longitudinal dimension markings disposed thereon for facilitating measurement of said track.

7. The terminal mounting track according to claim 1, wherein said mounting flanges each comprise a thin flattened member.

8. The terminal mounting track according to claim 7, wherein each of said mounting flanges have outer edges, said outer edges of said mounting flanges being parallel to each other.

9. The terminal mounting track according to claim 8, wherein said outer edges are spaced apart by a distance of between 0.5 and 1.5 inches.

10. The terminal mounting track according to claim 8, wherein said outer edges are spaced apart by a distance of between 0.8 and 1.0 inches.

11. The terminal mounting track according to claim 1, wherein said groove has an upper portion wherein said wall segments are parallel and a lower portion wherein said wall segments angle together.

12. The terminal mounting track according to claim 11, wherein said groove is sized to engage a #8 machine screw.

13. A terminal mounting track for supporting objects of more than one type, said track comprising:

a base configured for attaching said track to a support surface, the base consisting of a flattened member;

a support member comprising a substantially flat wall projecting generally perpendicularly from said base; and an elongated mounting rail supported by said support member in a spaced apart relationship with said base, said rail comprising a pair of spaced apart elongated mounting flanges and a midportion which joins said flanges to said support member, said midportion defining a first wall segment and a second wall segment, said wall segments being joined together so as to define a tapered groove configured to accept a sheet metal screw, said wall segments each bending outwardly from said groove so as to be generally coplanar and then bending upwardly so as to be generally parallel; whereby objects may be mounted to said track by a sheet metal screw engaging said groove.

14. The terminal mounting track according to claim 13, wherein said flanges extend outwardly from said midportion and terminate in outwardly directed edges, said flanges defining the portion of said track furthest from said base.

15. The terminal mounting track according to claim 13, wherein said support member includes a first side and a second side, and said base includes a first portion which extends from said first side and a second portion which extends from said second side so that said support member and said base have a generally T-shaped cross section.

16. The terminal mounting track according to claim 13, wherein said base has an upper surface and a lower surface, said lower surface having linear longitudinal dimension markings disposed thereon for facilitating measurement of said track.

17. A terminal mounting track for mounting terminal blocks and electrical devices thereto, the track of the type having a substantially flat base configured for attaching the track to a support surface, a support member comprising a substantially flat wall projecting generally perpendicularly from the base, and an elongated mounting rail supported by the support member, the rail having a pair of parallel spaced apart elongated mounting flanges and a midportion which joins the flanges to the support member, the flanges being flat members that extend outwardly from the midportion and terminate in outwardly directed edges configured to be gripped by the terminal block or electrical devices, the mid-portion comprising a pair of generally parallel portions extending downwardly from the flanges and a central portion which is generally perpendicular to the downwardly extending portions, the central portion interconnecting the downwardly extending portions with the support member, the improvement comprising:

the central portion of the midportion defining a first wall segment and a second wall segment, said wall segments being joined together so as to define a tapered groove configured to receive a sheer metal screw, whereby objects may be mounted to said track by a sheet metal screw engaging said groove.

18. The terminal mounting track according to claim 17, wherein the improvement further comprises:

said support member including a first side and a second side; and said base including a first portion which extends from said first side and a second portion which extends from said second side so that said support member and said base have a generally T-shaped cross section.

19. The terminal mounting track according to claim 17, wherein the improvement further comprises:

said base having an upper surface and a lower surface, said lower surface having linear longitudinal dimension markings disposed thereon for facilitating measurement of said track.

20. The terminal mounting track according to claim 17, wherein the improvement further comprises:

said groove having an upper portion wherein said wall segments are parallel and a lower portion wherein said wall segments angle together.

* * * * *